United States Patent
Chi et al.

(10) Patent No.: US 8,482,249 B2
(45) Date of Patent: Jul. 9, 2013

(54) CHARGING APPARATUS WITH ALTERNATING CURRENT- AND DIRECT CURRENT-CHARGING FUNCTIONS FOR MOBILE VEHICLE

(75) Inventors: Tse-Hua Chi, Taoyuan Shien (TW); Chang-Jyi Sheu, Taoyuan Shien (TW)

(73) Assignee: Delta Electronics, Inc., Taoyuan County (TW)

( * ) Notice: Subject to any disclaimer, the term of this patent is extended or adjusted under 35 U.S.C. 154(b) by 187 days.

(21) Appl. No.: 13/100,694

(22) Filed: May 4, 2011

(65) Prior Publication Data
US 2012/0169280 A1  Jul. 5, 2012

(30) Foreign Application Priority Data
Jan. 4, 2011  (TW) .............................. 100100233 A

(51) Int. Cl.
*H02J 7/00* (2006.01)
(52) U.S. Cl.
USPC ....................................................... 320/109
(58) Field of Classification Search
USPC ....................................................... 320/109
See application file for complete search history.

(56) References Cited

U.S. PATENT DOCUMENTS

| 5,521,788 | A  | * | 5/1996 | Miyazaki ........................ 361/42 |
| 6,838,856 | B2 | * | 1/2005 | Raichle ......................... 320/119 |
| 7,880,430 | B2 | * | 2/2011 | Gale et al. ..................... 320/109 |
| 7,996,083 | B2 | * | 8/2011 | Zhang et al. ...................... 607/9 |
| 8,253,376 | B2 | * | 8/2012 | Gale et al. ..................... 320/109 |
| 2011/0156643 | A1 | * | 6/2011 | Chen et al. .................... 320/109 |

* cited by examiner

*Primary Examiner* — Ramy Ramadan
(74) *Attorney, Agent, or Firm* — Muncy, Geissler, Olds & Lowe, PLLC

(57) ABSTRACT

A charging apparatus with alternating current- and direct current-charging functions for a mobile vehicle is disclosed. The charging apparatus receives an external direct current (DC) power source or an external alternating current (AC) power source and converts the DC power source or the AC power source into the required voltage and current for charging a rechargeable battery installed in the charging apparatus. The charging apparatus mainly includes a DC/DC conversion unit, an integrated DC/DC conversion and PFC unit, and a control unit. The control unit detects that the external power source is the DC power source or the AC power source. Furthermore, the charging apparatus controls the DC/DC conversion unit and the integrated DC/DC conversion and PFC unit according the type of the detected external power source, thus providing the required DC voltage level and charging current to the rechargeable battery.

10 Claims, 13 Drawing Sheets

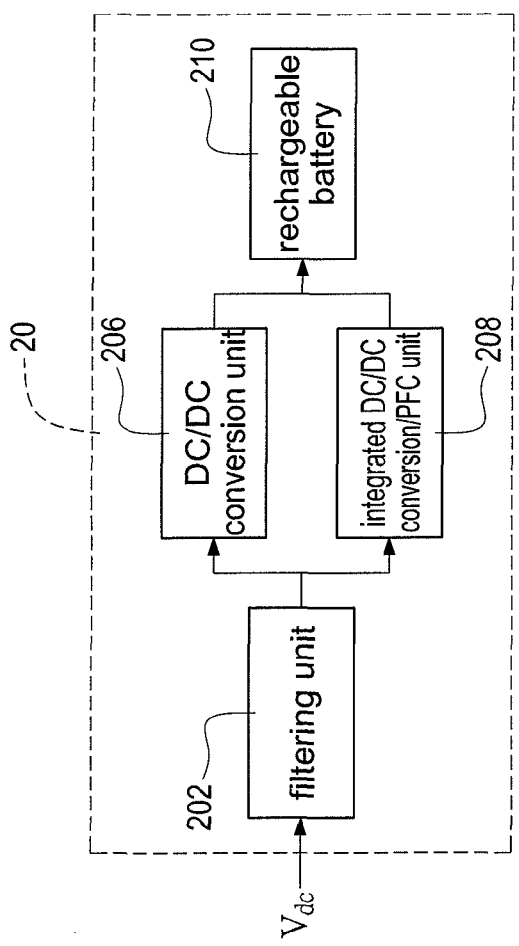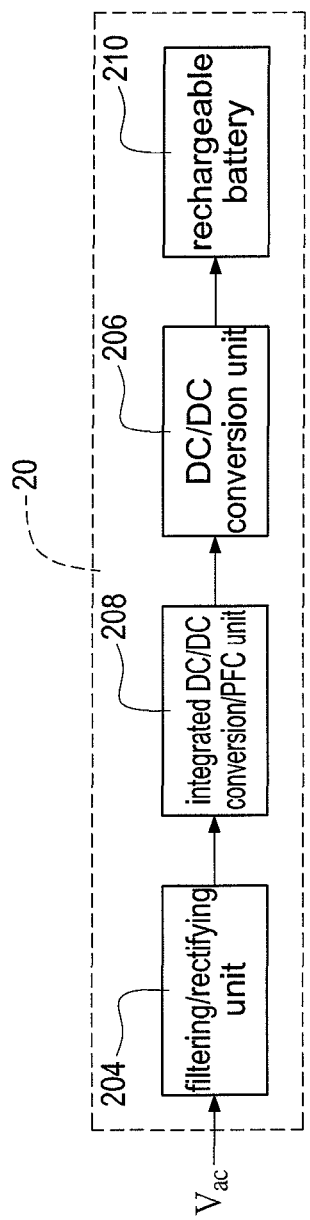
FIG. 2A
FIG. 2B

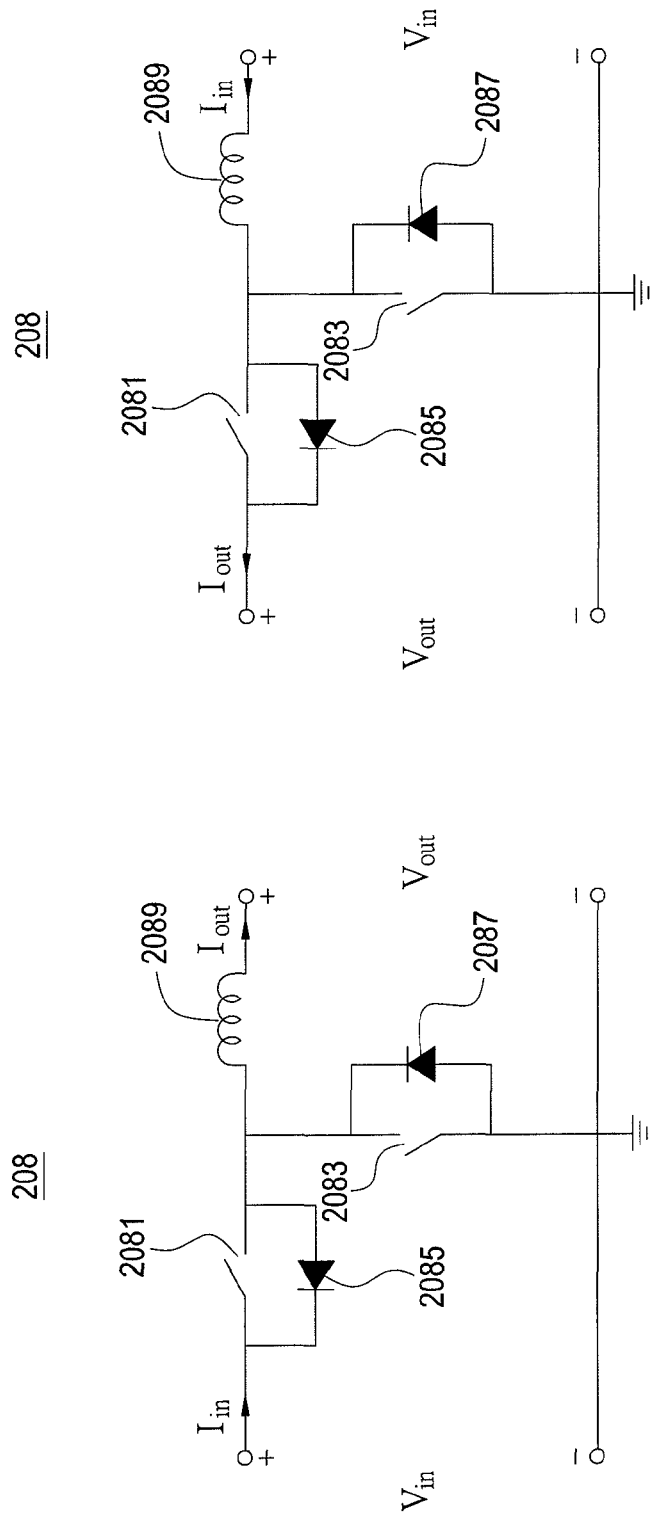

CHARGING APPARATUS WITH ALTERNATING CURRENT- AND DIRECT CURRENT-CHARGING FUNCTIONS FOR MOBILE VEHICLE

BACKGROUND OF THE INVENTION

1. Field of the Invention

The present invention relates to a charging apparatus for a mobile vehicle, and more particularly to a charging apparatus with alternating current- and direct current-charging functions for a mobile vehicle.

2. Description of Prior Art

For today's technologies of driving mobile vehicles, that will be developed toward the trend of pollution-free and high-efficiency purposes. The battery is usually used to store the desired energy for the electric vehicles. In particular, the various generated energies, such as coal-fire energy, hydraulic energy, wind energy, thermal energy, solar energy, and nuclear energy, have to be converted into the electrical energy so that the electrical energy can be stored in the battery. However, the major issues of security, efficiency, and convenience have to be concerned during the energy conversion process.

Reference is made to FIG. 1 which is a circuit block diagram of a prior art charging system of a mobile vehicle. The charging system of the mobile vehicle (not shown) mainly includes a charging apparatus 10A and a rechargeable battery 20A. The mobile vehicle can be an electric vehicle, and the rechargeable battery 20A is a rechargeable battery of the electric vehicle.

The charging apparatus 10A has an EMI filter 102A, a power factor corrector 104A, and a non-isolated/isolated DC/DC converter 106A.

The EMI filter 102A of the charging apparatus 10A is electrically connected to an external AC power source Vs to eliminate the noise in the AC power source Vs, thus preventing the conductive electromagnetic interference. The power factor corrector 104A is electrically connected to the EMI filter 102A to improve the power factor of the converted DC power source. The non-isolated/isolated DC/DC converter 106A is electrically connected to the power factor corrector 104A to provide the required DC voltage level. In particular, the non-isolated/isolated DC/DC converter 106A can be a buck converter or a DC transformer.

In actual application, the charging apparatus 10A can be a charging station for electric vehicles. The charging apparatus 10A can provide a high DC voltage Vo that outputs a fixed power. The charging apparatus 10A typically outputs a 500-volt DC voltage that provides a 50-Kw or 30-kW power. If the power of the vehicle rechargeable battery 20A is insufficient, the rechargeable battery 20A is charged by directly connecting the charging apparatus 10A to the rechargeable battery 20A.

In the prior art charging system of the mobile vehicle, however, the charging apparatus 10A can not be efficiently applied to different types of the power source due to the conventional structure of the charging apparatus 10A.

Accordingly, it is desirable to provide a charging apparatus with alternating current- and direct current-charging functions for a mobile vehicle according to that the received external power source is the DC power source or the AC power source, thus providing the required DC voltage level and charging current to a rechargeable battery of the mobile vehicle.

SUMMARY OF THE INVENTION

In order to solve the above-mentioned problems, a charging apparatus with alternating current- and direct current-charging functions for a mobile vehicle is disclosed. The charging apparatus receives an external AC power source or an external DC power source and converts the received AC power source into a DC power source for providing the required voltage and current to charge a rechargeable battery installed in the charging apparatus. The charging apparatus includes a filtering unit, at least one DC/DC conversion unit, and a control unit.

The filtering unit receives and filters the external DC power source or the converted DC power source. The DC/DC conversion unit is electrically connected to the filtering unit. The control unit is electrically connected to the DC/DC conversion unit and the rechargeable battery to control the DC/DC conversion unit.

Therefore, the control unit provides a power conversion to provide the required DC charging voltage level and charging current to the rechargeable battery.

In order to solve the above-mentioned problems, a charging apparatus with alternating current- and direct current-charging functions for a mobile vehicle is disclosed. The charging apparatus receives an external DC power source or an external AC power source and converts the received DC power source or the received AC power source for providing the required voltage and current to charge a rechargeable battery installed in the charging apparatus. The charging apparatus includes a first switch unit, a second switch unit, a filtering unit, a filtering and rectifying unit, a DC/DC conversion unit, an integrated DC/DC conversion and PFC unit, and a control unit.

The first switch unit has a first common contact, a first contact, and a second contact. The second switch unit has a second common contact, a third contact, and a fourth contact; the third contact of the second switch unit is electrically connected to the second contact of the first switch unit. The filtering unit receives the external DC power source and is electrically connected to the first contact of the first switch unit to filter the external DC power source. The filtering and rectifying unit receives the external AC power source and is electrically connected to the filtering unit and the first contact of the first switch unit to filter and rectify the external AC power source. The DC/DC conversion unit is electrically connected to the first common contact of the first switch unit, the fourth contact of the second switch unit, and the rechargeable battery. The integrated DC/DC conversion and PFC unit is electrically connected to the filtering and rectifying unit and the second common contact of the second switch unit.

The control unit is electrically connected to the first switch unit and the second switch unit to control the first switch unit and the second switch unit; the first common contact of the first switch unit is electrically connected to the first contact of the first switch unit and the second common contact of the second switch unit is electrically connected to the fourth contact of the second switch unit when the charging apparatus receives the DC power source; the first common contact of the first switch unit is electrically connected to the second contact of the first switch unit and the second common contact of the second switch unit is electrically connected to the third contact of the second switch unit when the charging apparatus receives the AC power source.

Wherein the DC/DC conversion unit is electrically connected in parallel to the integrated DC/DC conversion and PFC unit to receive and convert the DC power source by controlling the first switch unit and the second switch unit, thus providing the required DC voltage level and charging current to the rechargeable battery when the charging apparatus receives the DC power source; the DC/DC conversion unit is electrically connected in series to the integrated DC/DC conversion and PFC unit to receive and convert the AC power source by controlling the first switch unit and the second switch unit, thus providing the required DC voltage level and charging current to the rechargeable battery when the charging apparatus receives the AC power source.

Therefore, the charging apparatus provides adaptive AC- or DC-charging functions for charging the rechargeable battery according to that the received external power source is the DC power source or the AC power source.

In order to solve the above-mentioned problems, a charging apparatus with alternating current- and direct current-charging functions for a mobile vehicle is disclosed. The charging apparatus receives an external DC power source or an external AC power source and converts the received DC power source or the received AC power for providing the required voltage and current to charge a rechargeable battery installed in the charging apparatus. The charging apparatus includes a switch unit, a filtering unit, a filtering and rectifying unit, a DC/DC conversion unit, a power factor correcting unit, and a control unit.

The switch unit has a common contact, a first contact, and a second contact. The filtering unit receives the external DC power source and is electrically connected to the first contact of the switch unit to filter the external DC power source. The filtering and rectifying unit receives the external AC power source and is electrically connected to the filtering unit and the first contact of the switch unit to filter and rectify the external AC power source. The DC/DC conversion unit is electrically connected to the common contact of the switch unit and the rechargeable battery. The power factor correcting unit is electrically connected to the filtering and rectifying unit and the second contact of the switch unit.

The control unit is electrically connected to the switch unit to control the switch unit. The common contact of the switch unit is electrically connected to the first contact of the switch unit when the charging apparatus receives the DC power source; the common contact of the switch unit is electrically connected to the second contact of the switch unit when the charging apparatus receives the AC power source.

Wherein the DC/DC conversion unit is electrically connected to the filtering unit to receive and convert the DC power source by controlling the switch unit, thus providing the required DC voltage level and charging current to the rechargeable battery when the charging apparatus receives the DC power source; the DC/DC conversion unit is electrically connected in series to the power factor correcting unit to receive and convert the AC power source by controlling the switch unit, thus providing the required DC voltage level and charging current to the rechargeable battery when the charging apparatus receives the AC power source.

Therefore, the charging apparatus provides adaptive AC- or DC-charging functions for charging the rechargeable battery according to that the received external power source is the DC power source or the AC power source.

It is to be understood that both the foregoing general description and the following detailed description are exemplary, and are intended to provide further explanation of the invention as claimed. Other advantages and features of the invention will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

FIG. 2A is a circuit block diagram of the charging apparatus operating at a DC-charging condition according to the first embodiment of the present invention;

FIG. 2B is a circuit block diagram of the charging apparatus operating at an AC-charging condition according to the first embodiment of the present invention;

FIG. 2E is a circuit diagram showing voltage and current conditions of an integrated DC/DC conversion and PFC unit operating as a DC/DC conversion unit;

FIG. 2F is a circuit diagram showing voltage and current conditions of the integrated DC/DC conversion and PFC unit operating as a PFC unit;

DETAILED DESCRIPTION OF THE INVENTION

Figure 1:
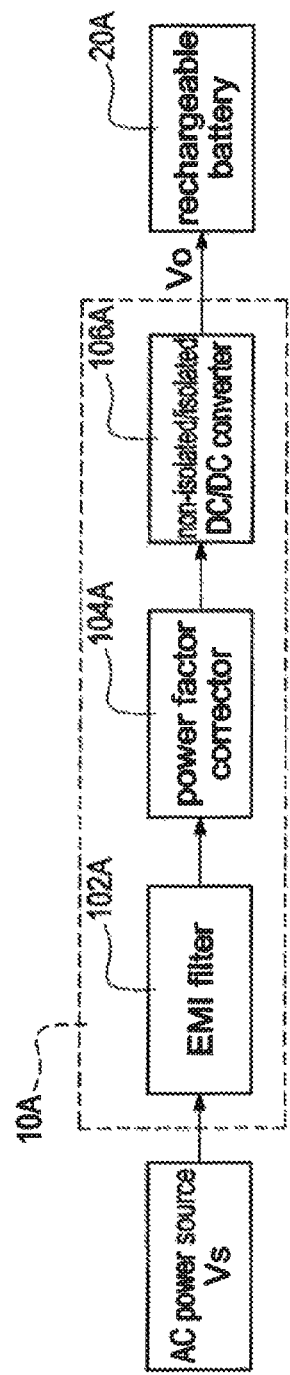
FIG. 1 is a circuit block diagram of a prior art charging system of a mobile vehicle.

Reference will now be made to the drawing figures to describe the present invention in detail.

Figure 2:
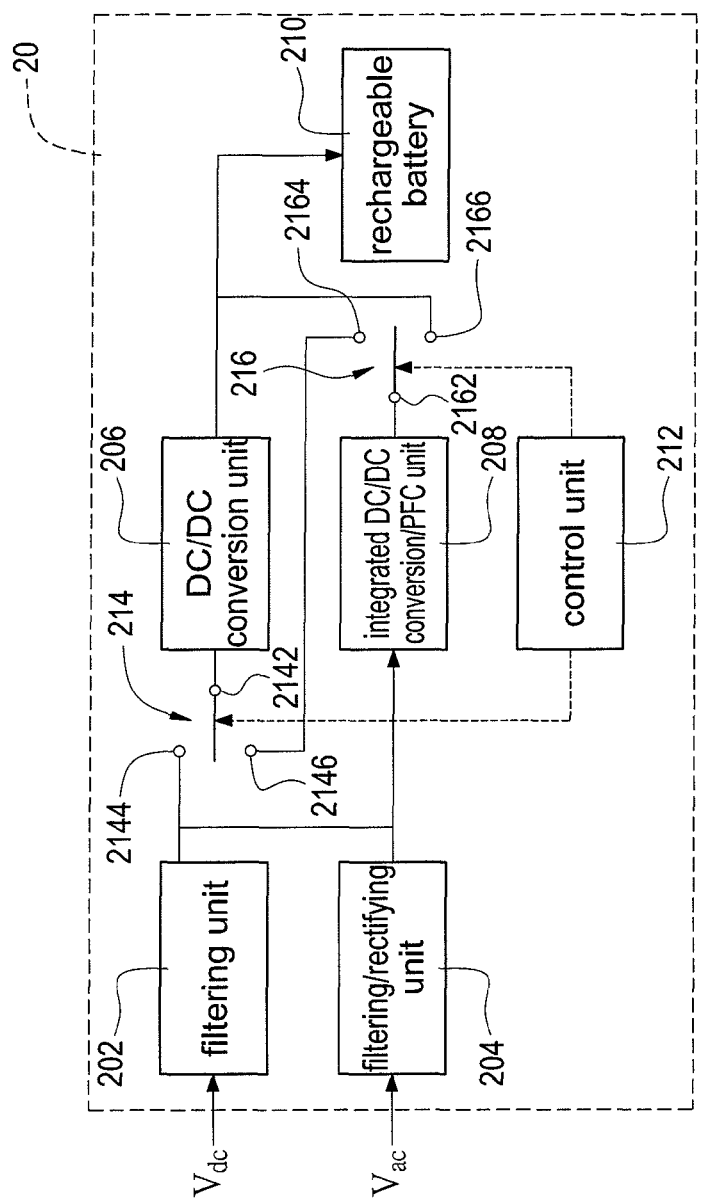
FIG. 2 is a circuit block diagram of a charging apparatus with AC- and DC-charging functions for a mobile vehicle according to a first embodiment of the present invention.

Reference is made to FIG. 2 which is a circuit block diagram of a charging apparatus with AC- and DC-charging functions for a mobile vehicle according to a first embodiment of the present invention. The mobile vehicle can be an electric vehicle. The charging apparatus 20 receives an external AC power source Vac or an external DC power source Vdc and converts the received AC power source Vac or the received DC power source Vdc for providing the required voltage and current to charge a rechargeable battery 210 installed in the charging apparatus 20. The charging apparatus 20 includes a first switch unit 214, a second switch unit 216, a filtering unit 202, a filtering and rectifying unit 204, a DC/DC conversion unit 206, an integrated DC/DC conversion and PFC unit 208, and a control unit 212.

The first switch unit 214 has a first common contact 2142, a first contact 2144, and a second contact 2146. The second switch unit 216 has a second common contact 2162, a third contact 2164, and a fourth contact 2166. In particular, the third contact 2164 of the second switch unit 216 is electrically connected to the second contact 2146 of the first switch unit 214.

The filtering unit 202 receives the external DC power source Vdc and is electrically connected to the first contact 2144 of the first switch unit 214 to filter the external DC power source Vdc. The filtering and rectifying unit 204 receives the external AC power source Vac and is electrically connected to the filtering unit 202 and the first contact 2144 of the first switch unit 214 to filter and rectify the external AC power source Vac. The DC/DC conversion unit 206 is electrically connected to the first common contact 2142 of the first switch unit 214, the fourth contact 2166 of the second switch unit 216, and the rechargeable battery 210. The integrated DC/DC conversion and PFC unit 208 is electrically connected to the filtering and rectifying unit 204 and the second common contact 2162 of the second switch unit 216.

The control unit 212 is electrically connected to the first switch unit 214 and the second switch unit 216 to control the first switch unit 214 and the second switch unit 216. The first common contact 2142 of the first switch unit 214 is electrically connected to the first contact 2144 of the first switch unit 214 and the second common contact 2162 of the second switch unit 216 is electrically connected to the fourth contact 2166 of the second switch unit 216 when the charging apparatus 20 receives the DC power source Vdc, which is detected by the control unit 212. In addition, the first common contact 2142 of the first switch unit 214 is electrically connected to the second contact 2146 of the first switch unit 214 and the second common contact 2162 of the second switch unit 216 is electrically connected to the third contact 2164 of the second switch unit 216 when the charging apparatus 20 receives the AC power source Vac, which is detected by the control unit 212. Furthermore, the control unit 212 is electrically connected to the DC/DC conversion unit 206, the integrated DC/DC conversion and PFC unit 208, and the rechargeable battery 210 to control the DC/DC conversion unit 206, the integrated DC/DC conversion and PFC unit 208 according to a use condition of the rechargeable battery 210, thus providing the required DC voltage level and charging current to the rechargeable battery 210. For example, if the rechargeable battery 210 is a high-capacity rechargeable battery, the control unit 212 controls the DC/DC conversion unit 206, the integrated DC/DC conversion and PFC unit 208 to provide a larger charging current to the rechargeable battery 210, and vice versa. In addition, if the rechargeable battery 210 is operated at a high-temperature condition, the control unit 212 controls the DC/DC conversion unit 206, the integrated DC/DC conversion and PFC unit 208 to provide a smaller charging current to the rechargeable battery 210, and vice versa.

Reference is made to FIG. 2A which is a circuit block diagram of the charging apparatus operating at a DC-charging condition according to the first embodiment of the present invention. By controlling the switching of the first switch unit 214 and the second switch unit 216 through the control unit 212 (as shown in FIG. 2), the DC/DC conversion unit 206 is electrically connected in parallel to the integrated DC/DC conversion and PFC unit 208 to receive the filtered DC power source (not labeled) when the charging apparatus 20 receives the DC power source Vdc. That is, the DC/DC conversion unit 206 and the integrated DC/DC conversion and PFC unit 208 have the same in-parallel input terminal and output terminal. In this operation, the integrated DC/DC conversion and PFC unit 208 provides a DC/DC conversion function. Accordingly, the DC/DC conversion unit 206 is electrically connected in parallel to the integrated DC/DC conversion and PFC unit 208, thus providing the required DC voltage level and charging current to the rechargeable battery 210.

Reference is made to FIG. 2B which is a circuit block diagram of the charging apparatus operating at an AC-charging condition according to the first embodiment of the present invention. By controlling the switching of the first switch unit 214 and the second switch unit 216 through the control unit 212 (as shown in FIG. 2), the DC/DC conversion unit 206 is electrically connected in series to the integrated DC/DC conversion and PFC unit 208 to receive the filtered and rectified AC power source (not labeled) when the charging apparatus 20 receives the AC power source Vac. That is, the integrated DC/DC conversion and PFC unit 208 is electrically connected between the filtering and rectifying unit 204 and the DC/DC conversion unit 206. The integrated DC/DC conversion and PFC unit 208 provides a power factor correcting (PFC) function to convert the filtered and rectified AC power source, thus providing the required DC voltage level and charging current to the rechargeable battery 210.

Figure 2C:
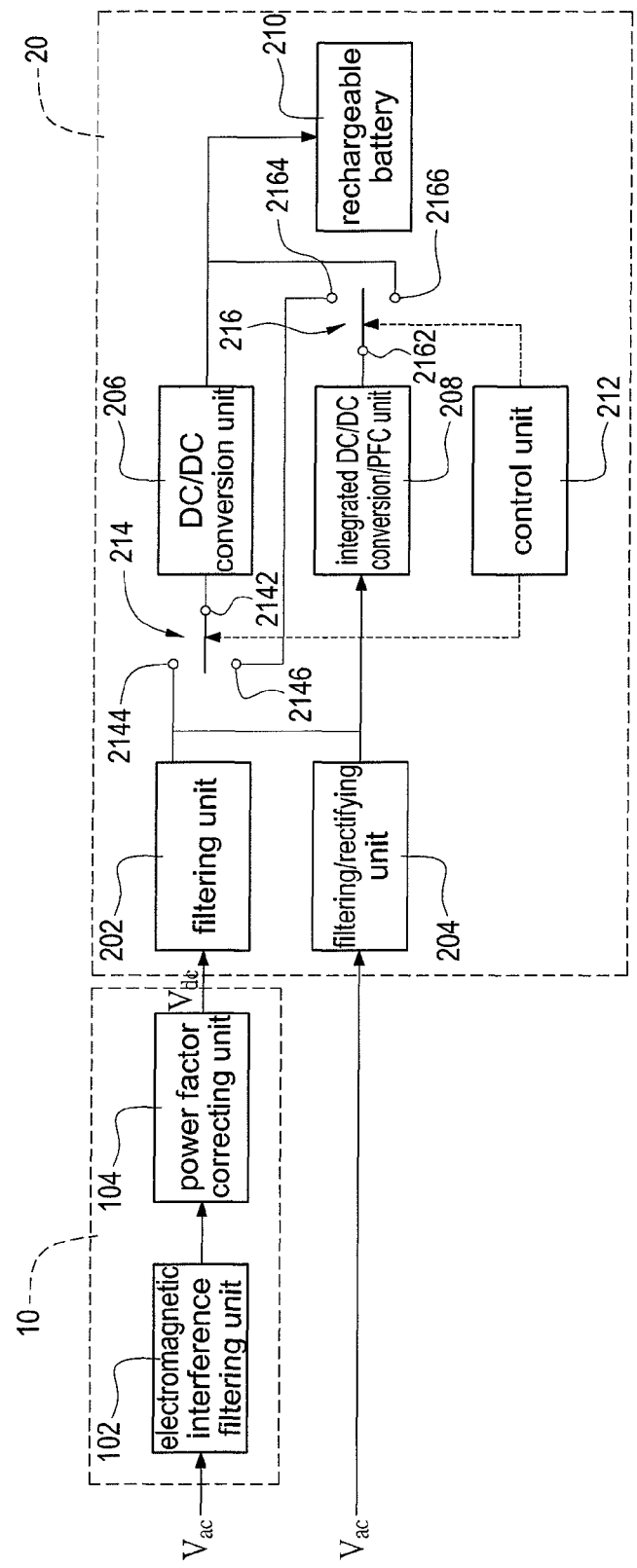
FIG. 2C is a circuit block diagram of the charging apparatus operating with a power conversion apparatus according to the first embodiment of the present invention.

In particular, the DC power source Vdc can be obtained by converting the AC power source Vac through a power conversion apparatus 10. Reference is made to FIG. 2C which is a circuit block diagram of the charging apparatus operating with a power conversion apparatus according to the first embodiment of the present invention. The power conversion apparatus 10 includes an electromagnetic interference filtering unit 102 and a power factor correcting unit 104. The electromagnetic interference filtering unit 102 receives the external AC power source Vac to eliminate the noise in the AC power source Vac, thus preventing the conductive electromagnetic interference. The power factor correcting unit 104 is electrically connected to the electromagnetic interference filtering unit 102 to convert the filtered AC power source and output the DC power source Vdc. Typically, the DC power source Vdc is a 500-volt DC voltage that provides a 50-Kw or 30-kW power. In particular, the converted DC power source Vdc can be directly provided to the charging apparatus 20. In addition, the external AC power source Vac can be directly provided to the charging apparatus 20. The consequent operation of the charging apparatus 20 is the same as the above mention; hence, the detail description is omitted here for conciseness.

Figure 2D:
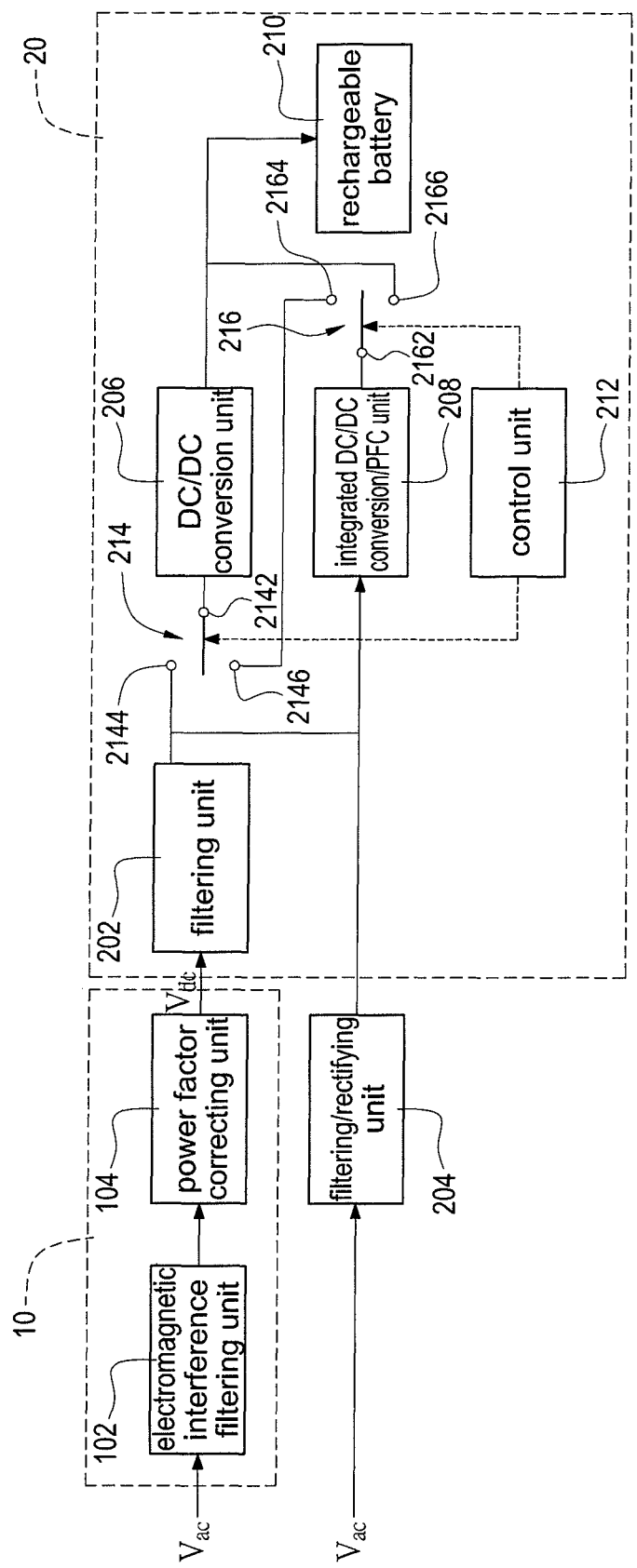
FIG. 2D is a circuit block diagram of a charging apparatus with AC- and DC-charging functions for a mobile vehicle according to a second embodiment of the present invention.

Reference is made to FIG. 2D which is a circuit block diagram of a charging apparatus with AC- and DC-charging functions for a mobile vehicle according to a second embodiment of the present invention. In particular, the circuit structure of the second embodiment is substantially identical to that of the first embodiment. The major difference is that the filtering and rectifying unit 204 is installed outside the charging apparatus 20 in the second embodiment. That is, the external AC power source Vac can be directly filtered and rectified by the outside filtering and rectifying unit 204, and then the filtered and filtered AC power source is converted into the required DC voltage level and charging current to the rechargeable battery 210 through the DC/DC conversion unit 206 and the integrated DC/DC conversion and PFC unit 208. However, the operation of this embodiment is the same as that of the first embodiment when the external DC power source Vdc is received; hence, the detail description is omitted here for conciseness.

The above-mentioned integrated DC/DC conversion and PFC unit 208 can be used as a DC/DC conversion unit (providing a DC/DC conversion function) or a PFC unit (providing a power factor correcting function). Reference is made to FIG. 2E and FIG. 2F which are circuit diagrams showing voltage and current conditions of an integrated DC/DC conversion and PFC unit operating as a DC/DC conversion unit and a PFC unit, respectively. The integrated DC/DC conversion and PFC unit 208 has a first switch 2081, a second switch 2083, a first anti-parallel diode 2085, a second anti-parallel diode 2087, and an inductor 2089. When the charging apparatus 20 receives the DC power source Vdc, the DC/DC conversion unit 206 and the integrated DC/DC conversion and PFC unit 208 have the same in-parallel input terminal and output terminal. In this operation, the integrated DC/DC conversion and PFC unit 208 provides the DC/DC conversion function and the integrated DC/DC conversion and PFC unit 208 plays a role as a buck converter. Accordingly, the DC/DC conversion unit 206 is electrically connected in parallel to the integrated DC/DC conversion and PFC unit 208, thus providing the required DC voltage level and charging current to the rechargeable battery 210. In addition, when the charging apparatus 20 receives the AC power source Vac, the DC/DC conversion unit 206 is electrically connected in series to the integrated DC/DC conversion and PFC unit 208. In this operation, the integrated DC/DC conversion and PFC unit 208 plays a role as a boost converter, that is, the integrated DC/DC conversion and PFC unit 208 provides a power factor correcting (PFC) function to convert the filtered and rectified AC power source, thus providing the required DC voltage level and charging current to the rechargeable battery 210.

Therefore, the charging apparatus 20 provides adaptive AC- or DC-charging functions for charging the rechargeable battery 210 according to that the received external power source is the DC power source or the AC power source, which is detected by the control unit 212.

Figure 3:
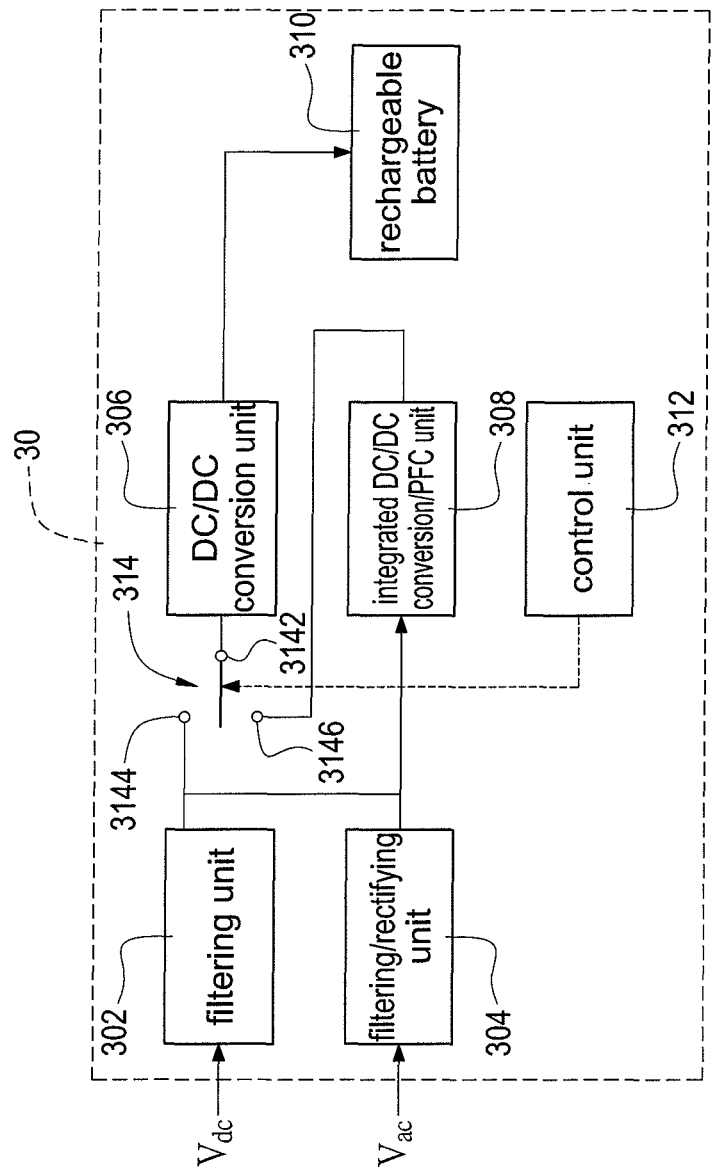
FIG. 3 is a circuit block diagram of a charging apparatus with AC- and DC-charging functions for a mobile vehicle according to a third embodiment of the present invention.

Reference is made to FIG. 3 which is a circuit block diagram of a charging apparatus with AC- and DC-charging functions for a mobile vehicle according to a third embodiment of the present invention. The charging apparatus 30 receives an external DC power source Vdc or an external AC power source Vac and converts the received DC power source Vdc or the received AC power source Vac for providing the required voltage and current to charge a rechargeable battery 310 installed in the charging apparatus 30. The charging apparatus 30 includes a switch unit 314, a filtering unit 302, a filtering and rectifying unit 304, a DC/DC conversion unit 306, a power factor correcting unit 308, and a control unit 312.

The switch unit 314 has a common contact 3142, a first contact 3144, and a second contact 3146. The filtering unit 302 receives the external DC power source Vdc and is electrically connected to the first contact 3144 of the switch unit 314 to filter the external DC power source Vdc. The filtering and rectifying unit 304 receives the external AC power source Vac and is electrically connected to the filtering unit 302 and the first contact 3144 of the switch unit 314 to filter and rectify the external AC power source Vac. The DC/DC conversion unit 306 is electrically connected to the common contact 3142 of the switch unit 314 and the rechargeable battery 310. The power factor correcting unit 308 is electrically connected to the filtering and rectifying unit 304 and the second contact 3146 of the switch unit 314.

The control unit 312 is electrically connected to the switch unit 314 to control the switch unit 314. The common contact 3142 of the switch unit 314 is electrically connected to the first contact 3144 of the switch unit 314 when the charging apparatus 30 receives the DC power source Vdc, which is detected by the control unit 312. In addition, the common contact 3142 of the switch unit 314 is electrically connected to the second contact 3146 of the switch unit 314 when the charging apparatus 30 receives the AC power source Vac, which is detected by the control unit 312. Furthermore, the control unit 312 is electrically connected to the DC/DC conversion unit 306, the power factor correcting unit 308, and the rechargeable battery 310 to control the DC/DC conversion unit 306, the power factor correcting unit 308 according to a use condition of the rechargeable battery 310, thus providing the required DC voltage level and charging current to the rechargeable battery 310. For example, if the rechargeable battery 310 is a high-capacity rechargeable battery, the control unit 312 controls the DC/DC conversion unit 306, the power factor correcting unit 308 to provide a larger charging current to the rechargeable battery 310, and vice versa. In addition, if the rechargeable battery 310 is operated at a high-temperature condition, the control unit 312 controls the DC/DC conversion unit 306, the power factor correcting unit 308 to provide a smaller charging current to the rechargeable battery 310, and vice versa.

Figure 3A:
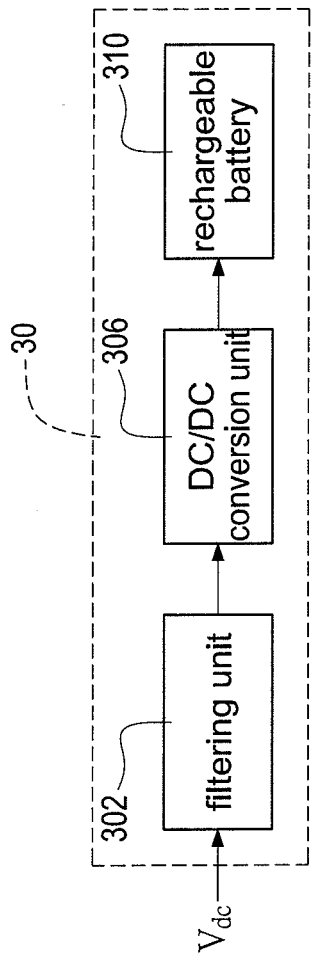
FIG. 3A is a circuit block diagram of the charging apparatus operating at a DC-charging condition according to the third embodiment of the present invention.

Reference is made to FIG. 3A which is a circuit block diagram of the charging apparatus operating at a DC-charging condition according to the third embodiment of the present invention. By controlling the switching of the switch unit 314 through the control unit 312 (as shown in FIG. 3), the DC/DC conversion unit 306 is electrically connected to the filtering unit 302 to receive the filtered DC power source (not labeled) and convert the voltage level of the filtered DC power source when the charging apparatus 30 receives the DC power source Vdc, thus providing the required DC voltage level and charging current to the rechargeable battery 310.

Figure 3B:
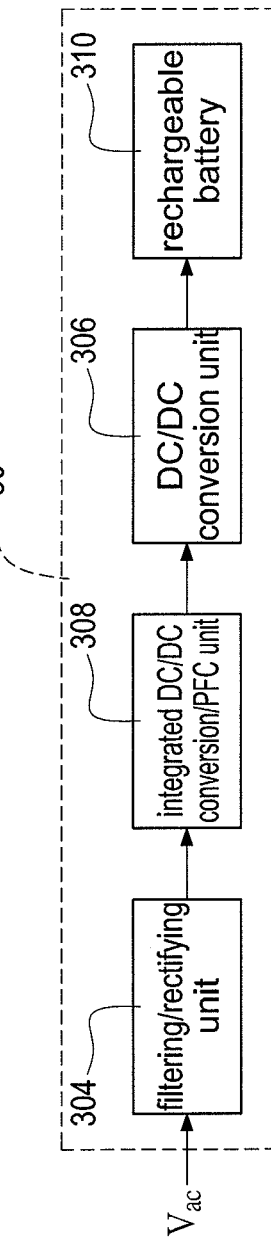
FIG. 3B is a circuit block diagram of the charging apparatus operating at an AC-charging condition according to the third embodiment of the present invention.

Reference is made to FIG. 3B which is a circuit block diagram of the charging apparatus operating at an AC-charging condition according to the third embodiment of the present invention. By controlling the switching of the switch unit 314 through the control unit 312 (as shown in FIG. 3), the DC/DC conversion unit 306 is electrically connected in series to the power factor correcting unit 308 to receive the filtered and rectified AC power source (not labeled) and convert the voltage level of the filtered and rectified AC power source when the charging apparatus 30 receives the AC power source Vac, thus providing the required DC voltage level and charging current to the rechargeable battery 310.

Figure 3C:
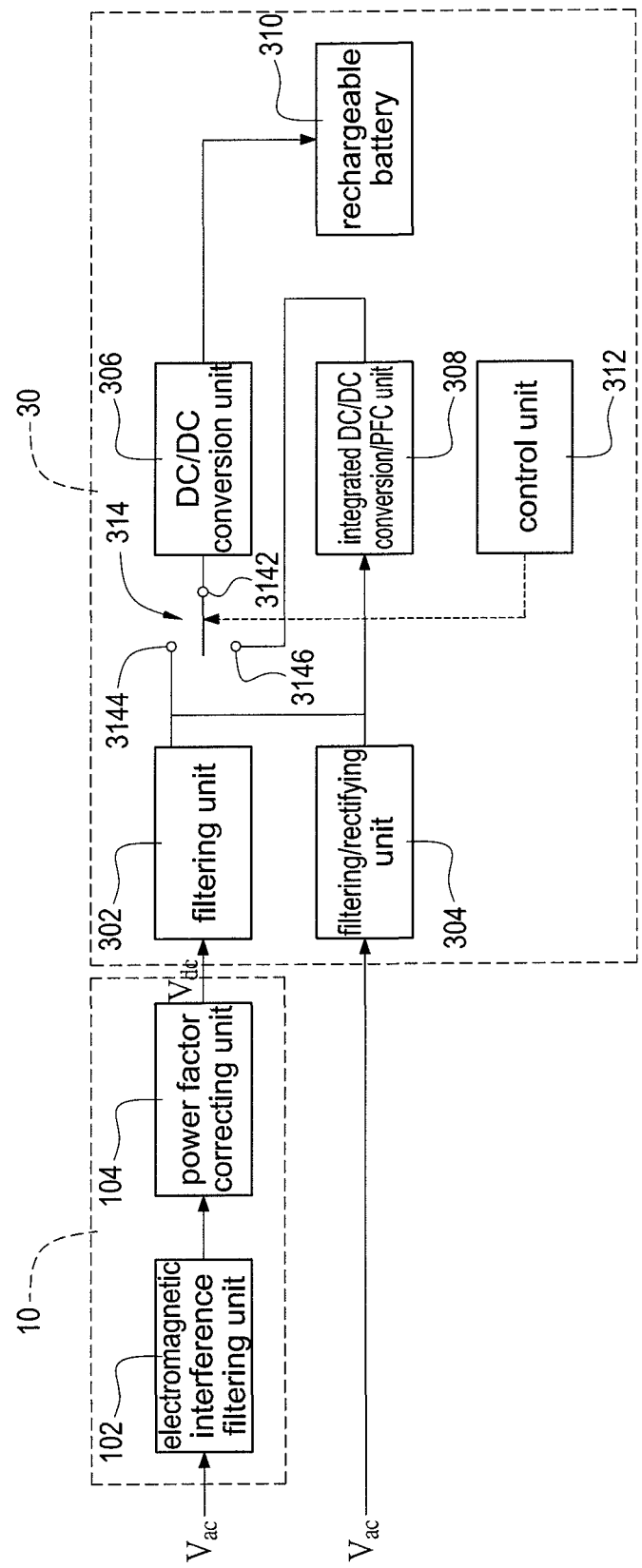
FIG. 3C is a circuit block diagram of the charging apparatus operating with a power conversion apparatus according to the third embodiment of the present invention.

In particular, the DC power source Vdc can be obtained by converting the AC power source Vac through a power conversion apparatus 10. Reference is made to FIG. 3C which is a circuit block diagram of the charging apparatus operating with a power conversion apparatus according to the third embodiment of the present invention. The power conversion apparatus 10 includes an electromagnetic interference filtering unit 102 and a power factor correcting unit 104. The electromagnetic interference filtering unit 102 receives the external AC power source Vac to eliminate the noise in the AC power source Vac, thus preventing the conductive electromagnetic interference. The power factor correcting unit 104 is electrically connected to the electromagnetic interference filtering unit 102 to convert the filtered AC power source and output the DC power source Vdc. Typically, the DC power source Vdc is a 500-volt DC voltage that provides a 50-Kw or 30-kW power. In particular, the converted DC power source Vdc can be directly provided to the charging apparatus 30. In addition, the external AC power source Vac can be directly provided to the charging apparatus 30. The consequent operation of the charging apparatus 30 is the same as the above mention; hence, the detail description is omitted here for conciseness.

Figure 3D:
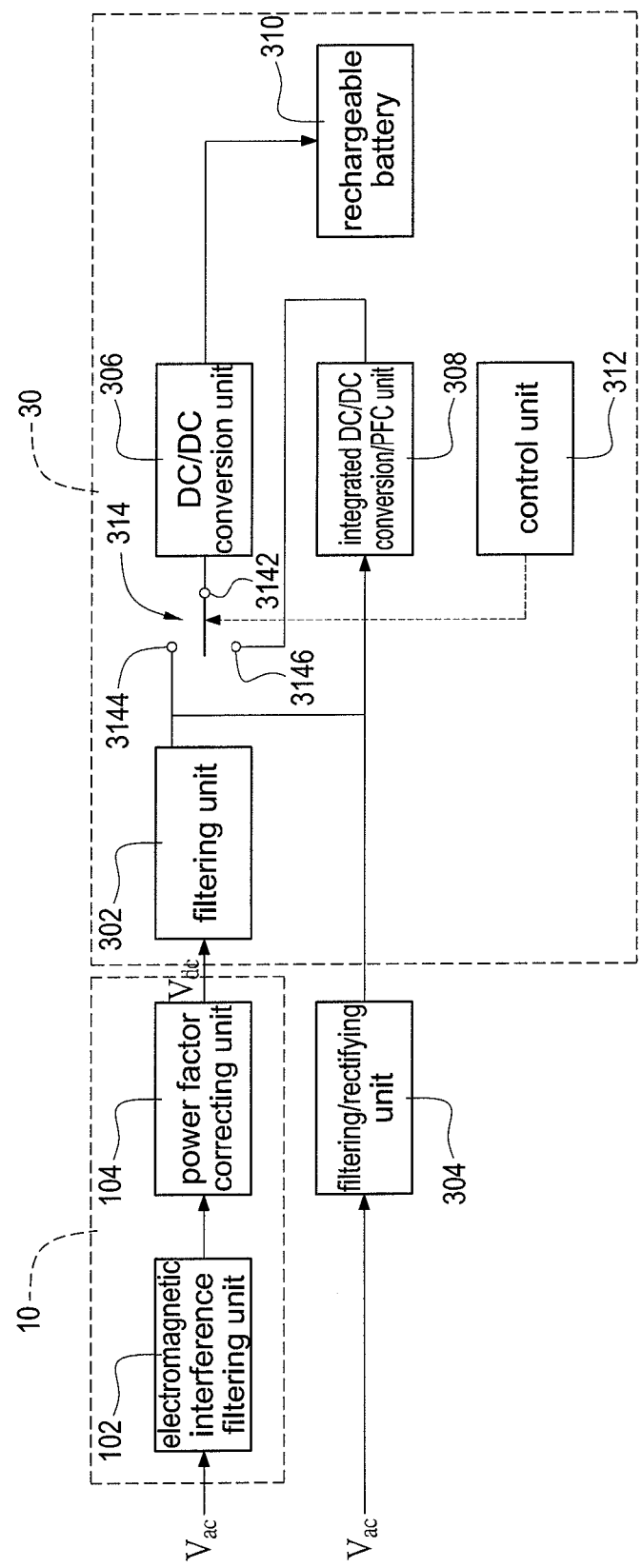
FIG. 3D is a circuit block diagram of a charging apparatus with AC- and DC-charging functions for a mobile vehicle according to a fourth embodiment of the present invention.

Reference is made to FIG. 3D which is a circuit block diagram of a charging apparatus with AC- and DC-charging functions for a mobile vehicle according to a fourth embodiment of the present invention. In particular, the circuit structure of the fourth embodiment is substantially identical to that of the second embodiment. The major difference is that the filtering and rectifying unit 304 is installed outside the charging apparatus 20 in the fourth embodiment. That is, the external AC power source Vac can be directly filtered and rectified by the outside filtering and rectifying unit 304, and then the filtered and filtered AC power source is converted into the required DC voltage level and charging current to the rechargeable battery 310 through the DC/DC conversion unit 306 and the power factor correcting unit 308. However, the operation of this embodiment is the same as that of the second embodiment when the external DC power source Vdc is received; hence, the detail description is omitted here for conciseness.

Therefore, the charging apparatus 30 provides adaptive AC- or DC-charging functions for charging the rechargeable battery 310 according to that the received external power source is the DC power source or the AC power source, which is detected by the control unit 312.

Figure 4:
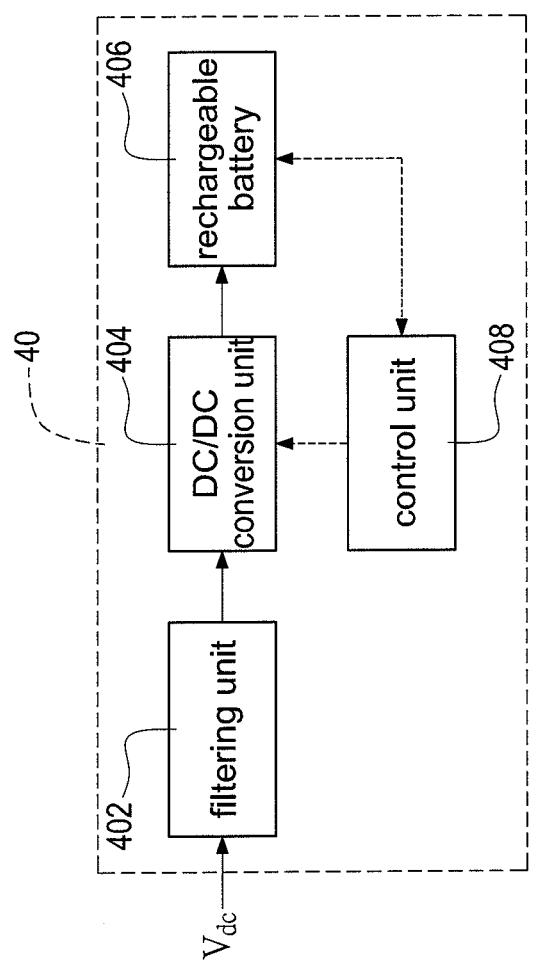
FIG. 4 is a circuit block diagram of a charging apparatus with AC- and DC-charging functions for a mobile vehicle according to a fifth embodiment of the present invention.

Reference is made to FIG. 4 which is a circuit block diagram of a charging apparatus with AC- and DC-charging functions for a mobile vehicle according to a fifth embodiment of the present invention. The charging apparatus 40 receives an external DC power source Vdc to provide the required voltage and current to charge a rechargeable battery 406 installed in the charging apparatus 40. The charging apparatus 40 includes a filtering unit 402, at least one DC/DC conversion unit 404, and a control unit 408.

The filtering unit 402 receives and filters the external DC power source Vdc. The DC/DC conversion unit 404 is electrically connected to the filtering unit 402. The control unit 408 is electrically connected to the DC/DC conversion unit 404 and the rechargeable battery 406 to control the DC/DC conversion unit 404. The control unit 408 controls the DC/DC conversion unit 404 according to a use condition of the rechargeable battery 406, thus providing the required DC voltage level and charging current to the rechargeable battery 406. For example, if the rechargeable battery 406 is a high-capacity rechargeable battery, the control unit 408 controls the DC/DC conversion unit 404 to provide a larger charging current to the rechargeable battery 406, and vice versa. In addition, if the rechargeable battery 406 is operated at a high-temperature condition, the control unit 408 controls the DC/DC conversion unit 404 to provide a smaller charging current to the rechargeable battery 406, and vice versa.

Figure 4A:
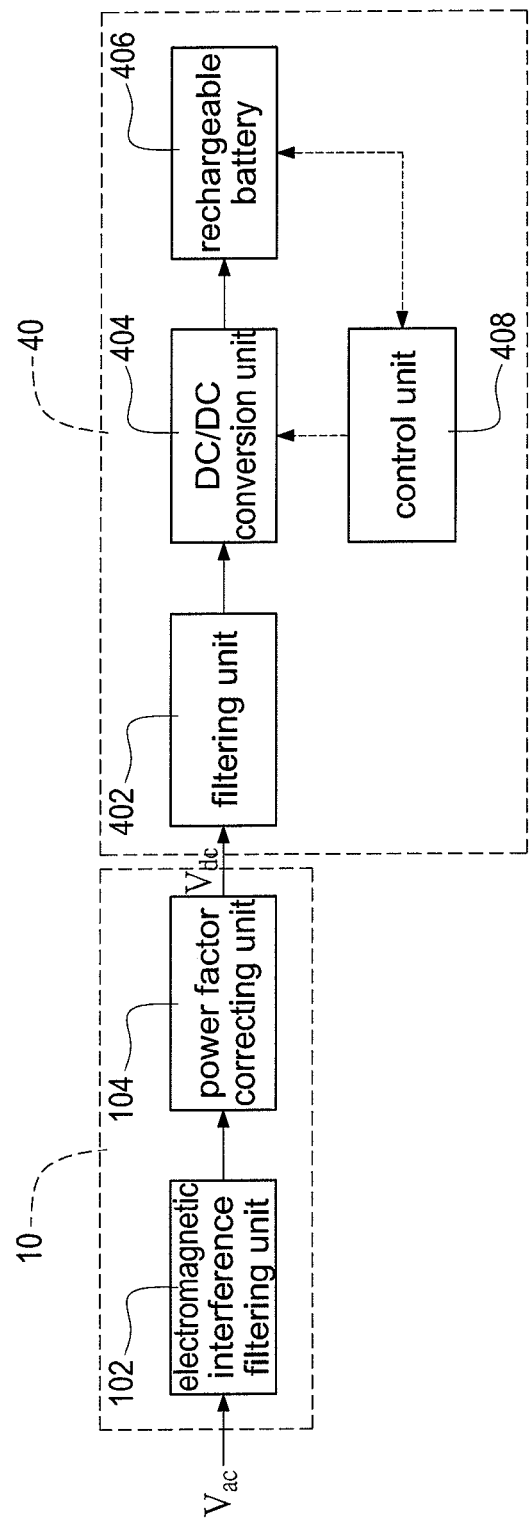
FIG. 4A is a circuit block diagram of a charging apparatus with AC- and DC-charging functions for a mobile vehicle according to a sixth embodiment of the present invention.

In particular, the DC power source Vdc can be obtained by converting the AC power source Vac through a power conversion apparatus 10. Reference is made to FIG. 4A is a circuit block diagram of a charging apparatus with AC- and DC-charging functions for a mobile vehicle according to a sixth embodiment of the present invention. The power conversion apparatus 10 includes an electromagnetic interference filtering unit 102 and a power factor correcting unit 104. The electromagnetic interference filtering unit 102 receives the external AC power source Vac to eliminate the noise in the AC power source Vac, thus preventing the conductive electromagnetic interference. The power factor correcting unit 104 is electrically connected to the electromagnetic interference filtering unit 102 to convert the filtered AC power source and output the DC power source Vdc. In particular, the converted DC power source Vdc can be directly provided to the charging apparatus 40. The consequent operation of the charging apparatus 40 is the same as the above mention; hence, the detail description is omitted here for conciseness.

Figure 4B:
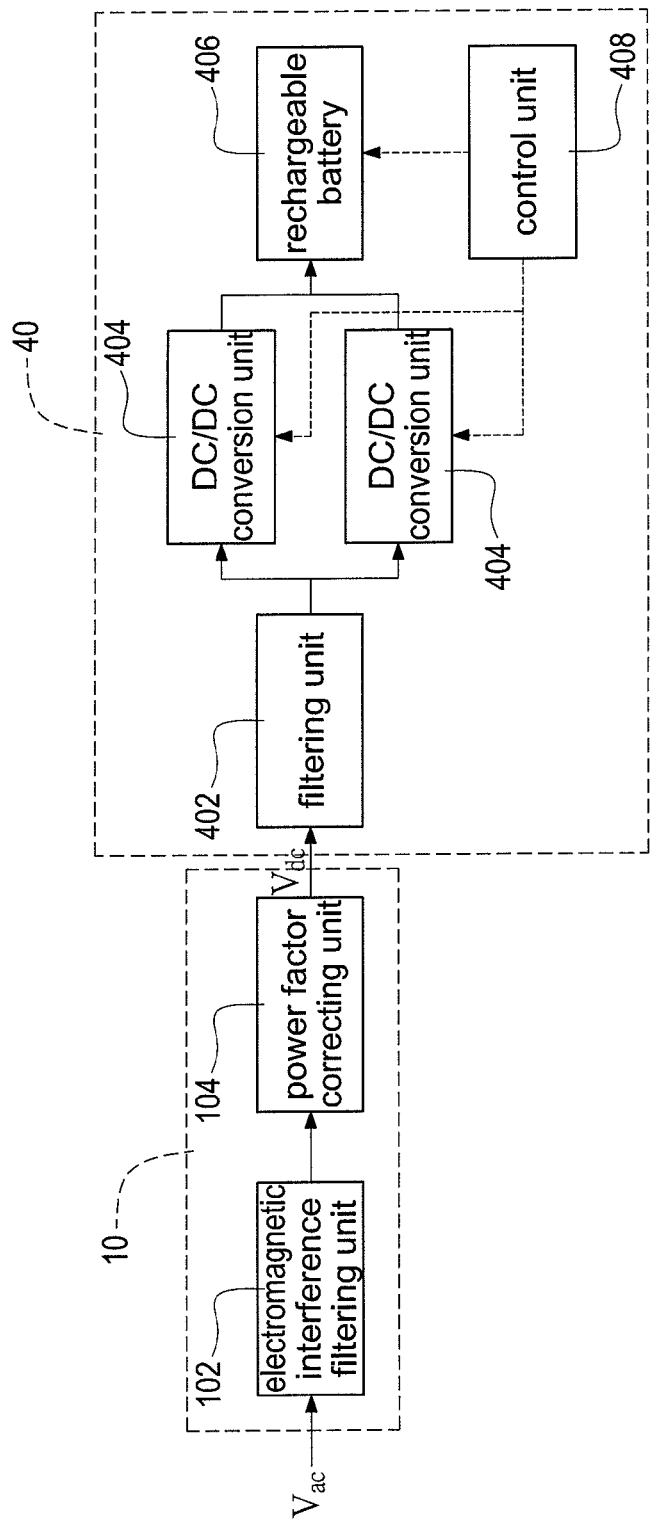
FIG. 4B is a circuit block diagram of a charging apparatus with AC- and DC-charging functions for a mobile vehicle according to a seventh embodiment of the present invention.

Reference is made to FIG. 4B which is a circuit block diagram of a charging apparatus with AC- and DC-charging functions for a mobile vehicle according to a seventh embodiment of the present invention. If the amount of the DC/DC conversion unit 404 is greater than or equal to two (there are two DC/DC conversion units are shown in FIG. 4B), the DC/DC conversion units 404 are electrically connected to each other and controlled by the control unit 408. Accordingly, combining a plurality of small-power DC/DC conversion units to provide a large-power output and provide adaptive charging functions to the rechargeable battery 406, thus increasing the charging reliability, safety, and speed.

Therefore, the control unit 408 provides a power conversion to provide the required DC charging voltage level and charging current to the rechargeable battery 406.

In conclusion, the present invention has following advantages:

1. The charging apparatus provides adaptive AC- or DC-charging functions for charging the rechargeable battery according to that the received external power source is the DC power source or the AC power source; and 2. A plurality of small-power DC/DC conversion units can be combined to provide a large-power output and provide adaptive charging functions to the rechargeable battery, thus increasing the charging reliability, safety, and speed.

Although the present invention has been described with reference to the preferred embodiment thereof, it will be understood that the invention is not limited to the details thereof Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A charging apparatus with alternating current- and direct current-charging functions for a mobile vehicle, the charging apparatus receiving an external DC power source or an external AC power source and converting the received DC power source or the received AC power for providing the required voltage and current to charge a rechargeable battery installed in the charging apparatus; the charging apparatus comprising:
   a first switch unit having a first common contact, a first contact, and a second contact;
   a second switch unit having a second common contact, a third contact, and a fourth contact; the third contact of the second switch unit electrically connected to the second contact of the first switch unit;
   a filtering unit receiving the external DC power source and electrically connected to the first contact of the first switch unit to filter the external DC power source;
   a filtering and rectifying unit receiving the external AC power source and electrically connected to the filtering unit and the first contact of the first switch unit to filter and rectify the external AC power source;
   a DC/DC conversion unit electrically connected to the first common contact of the first switch unit, the fourth contact of the second switch unit, and the rechargeable battery;
   an integrated DC/DC conversion and PFC unit electrically connected to the filtering and rectifying unit and the second common contact of the second switch unit; and a control unit electrically connected to the first switch unit and the second switch unit to control the first switch unit and the second switch unit; the first common contact of the first switch unit electrically connected to the first contact of the first switch unit and the second common contact of the second switch unit electrically connected to the fourth contact of the second switch unit when the charging apparatus receiving the DC power source; the first common contact of the first switch unit electrically connected to the second contact of the first switch unit and the second common contact of the second switch unit electrically connected to the third contact of the second switch unit when the charging apparatus receiving the AC power source;

wherein the DC/DC conversion unit is electrically connected in parallel to the integrated DC/DC conversion and PFC unit to receive and convert the DC power source by controlling the first switch unit and the second switch unit, thus providing the required DC voltage level and charging current to the rechargeable battery when the charging apparatus receives the DC power source; the DC/DC conversion unit is electrically connected in series to the integrated DC/DC conversion and PFC unit to receive and convert the AC power source by controlling the first switch unit and the second switch unit, thus providing the required DC voltage level and charging current to the rechargeable battery when the charging apparatus receives the AC power source;

whereby the charging apparatus provides adaptive AC- or DC-charging functions for charging the rechargeable battery according to that the received external power source is the DC power source or the AC power source.

2. The charging apparatus in claim 1, further comprising a power conversion apparatus having:
an electromagnetic interference filtering unit receiving the external AC power source to eliminate the noise in the AC power source; and
a power factor correcting unit electrically connected to the electromagnetic interference filtering unit to convert the filtered AC power source and output the DC power source.

3. The charging apparatus in claim 1, wherein the integrated DC/DC conversion and PFC unit is a buck converter providing a DC/DC conversion function when the charging apparatus receives the DC power source.

4. The charging apparatus in claim 1, wherein the integrated DC/DC conversion and PFC unit is a boost converter providing a power factor correcting function when the charging apparatus receives the AC power source.

5. The charging apparatus in claim 1, wherein the control unit is electrically connected to the DC/DC conversion unit, the integrated DC/DC conversion and PFC unit, and the rechargeable battery to control the DC/DC conversion unit, the integrated DC/DC conversion and PFC unit according to a use condition of the rechargeable battery, thus providing the required DC voltage level and charging current to the rechargeable battery.

6. The charging apparatus in claim 1, wherein the filtering and rectifying unit is installed outside the charging apparatus.

7. A charging apparatus with alternating current and direct current-charging functions for a mobile vehicle, the charging apparatus receiving an external DC power source or an external AC power source and converting the received DC power source or the received AC power source for providing the required voltage and current to charge a rechargeable battery installed in the charging apparatus; the charging apparatus comprising:
a switch unit having a common contact, a first contact, and a second contact;
a filtering unit receiving the external DC power source and electrically connected to the first contact of the switch unit to filter the external DC power source;
a filtering and rectifying unit receiving the external AC power source and electrically connected to the filtering unit and the first contact of the switch unit to filter and rectify the external AC power source;
a DC/DC conversion unit electrically connected to the common contact of the switch unit and the rechargeable battery;
a power factor correcting unit electrically connected to the filtering and rectifying unit and the second contact of the switch unit; and
a control unit electrically connected to the switch unit to control the switch unit; the common contact of the switch unit electrically connected to the first contact of the switch unit when the charging apparatus receiving the DC power source; the common contact of the switch unit electrically connected to the second contact of the switch unit when the charging apparatus receiving the AC power source;

wherein the DC/DC conversion unit is electrically connected to the filtering unit to receive and convert the DC power source by controlling the switch unit, thus providing the required DC voltage level and charging current to the rechargeable battery when the charging apparatus receives the DC power source; the DC/DC conversion unit is electrically connected in series to the power factor correcting unit to receive and convert the AC power source by controlling the switch unit, thus providing the required DC voltage level and charging current to the rechargeable battery when the charging apparatus receives the AC power source;

whereby the charging apparatus provides adaptive AC or DC-charging functions for charging the rechargeable battery according to that the received external power source is the DC power source or the AC power source.

8. The charging apparatus in claim 7, further comprising a power conversion apparatus having:
an electromagnetic interference filtering unit receiving the external AC power source to eliminate the noise in the AC power source; and
a power factor correcting unit electrically connected to the electromagnetic interference filtering unit to convert the filtered AC power source and output the DC power source.

9. The charging apparatus in claim 7, wherein the control unit is electrically connected to the DC/DC conversion unit, the power factor correcting unit, and the rechargeable battery to control the DC/DC conversion unit and the power factor correcting unit according to a use condition of the rechargeable battery, thus providing the required DC voltage level and charging current to the rechargeable battery.

10. The charging apparatus in claim 7, wherein the filtering and rectifying unit is installed outside the charging apparatus.

* * * * *